United States Patent
Lindstrom et al.

[11] Patent Number: 6,079,807
[45] Date of Patent: Jun. 27, 2000

[54] PRINT MODE MAPPING FOR PLAIN PAPER AND TRANSPARENCY

[75] Inventors: Christina J. Lindstrom, Portland, Oreg.; Mark D. Lund; John A. Underwood, both of Vancouver, Wash.

[73] Assignee: Hewlett-Packard Company, Fort Colllins, Colo.

[21] Appl. No.: 08/986,718

[22] Filed: Dec. 8, 1997

[51] Int. Cl.[7] .................................................. B41J 29/38
[52] U.S. Cl. ............................................. 347/16; 347/14
[58] Field of Search .................................. 347/16, 15, 14, 347/105, 12, 5, 9, 43, 101; 358/502, 506, 523, 462, 296, 305

[56] References Cited

U.S. PATENT DOCUMENTS 4,617,580  10/1986  Miyakawa ................................. 347/14
5,774,146   6/1998  Mitzutani ................................. 347/16

OTHER PUBLICATIONS

Patent Abstracts of Japan vol. 016, No. 030 (M–1203), Jan. 24, 1992 and JP 03 2405641 A (Canon Inc.), Oct. 25, 1991.
Patent Abstracts of Japan vol. 096, No. 002, Feb. 29, 1996 and JP 07 276673 A (Canon Inc.), Oct. 24, 1995.
European Search Report for related European Patent Application S/N 981 13022.2–2304 dated Jul. 23, 1999.

*Primary Examiner*—John Barlow
*Assistant Examiner*—Juanita Stephens

[57] ABSTRACT

A printer automatically selects the print mode depending upon media type. The printer has a media handler to convey media through the printer and a media sensor to detect whether the media is transparent. The printer also has a printing mechanism configured to print a print file using a print mode that is selected based upon the type of media detected by the media sensor and whether the print file is intended for that media type.

6 Claims, 2 Drawing Sheets

PRINT MODE MAPPING FOR PLAIN PAPER AND TRANSPARENCY

TECHNICAL FIELD

This invention relates to printers, and more particularly, to printers capable of printing on different types of media, including plain paper and transparencies.

BACKGROUND

Conventional printers are capable of printing on many different types of media, including plain paper and transparencies. To compensate for the different media types, some printers employ different print modes to print on the different media. For example, the printers might apply different volumes of ink and print at different rates to achieve higher quality results for each media type.

Such printers rely on the user to select the correct media type when they print. When a transparency or glossy media is in the printer tray, the printer presumes that the user will select an option in the driver for printing on the transparency or glossy.

Unfortunately, many users are unaware of the need to select options for different media types. The users simply press a "print" button that defaults to a normal, plain paper print mode. While these normal settings are effective for plain paper, they are not optimal for other media types, especially transparency. Transparencies often require more ink for bright vibrant colors. In addition, printing on certain types of transparencies may require more time as compared to printing on plain paper, because the ink takes longer to sink in and dry on transparency. As a result, when a printer is set to a transparency option (perhaps from a previous print job), but plain paper is in the tray, the images printed on the paper are overly dark and wet.

Accordingly, there is a need to overcome this problem so that the printer need not rely on the user to elect an appropriate print option for the current media in the tray.

SUMMARY

This invention concerns a printer that can modify its default print mode selections depending upon the type of media present in the printer and the type of print file intended to be printed. The printer has a media handler to convey media through the printer and a media sensor to detect whether the media is transparent or opaque plain paper. The media sensor may also be configured to detect among different types of transparent media, such as transparent media with a paper strip and transparent media without paper strips.

The printer also has a printing mechanism that automatically selects a print mode for printing a print file depending upon the type of media detected by the media sensor and the type of print file. In the described implementation, the printing mechanism can select among five different print modes.

The printing mechanism chooses a paper print mode if the media is paper and the print file is for paper. If the print file is intended for a transparency but the media sensor detects paper, the printing mechanism chooses a transparent-to-paper print mode that changes the printer settings from transparency to paper. If the print file is intended for paper but the media sensor detects a transparency, the printing mechanism chooses a paper-to-transparency print mode that changes the printer settings from paper to transparency. If the print file is for a transparency and the media sensor detects a transparency, the printing mechanism employs one of two types of transparency print modes, depending upon the type of transparent media detected by the media sensor: one print mode that allows for slow drying transparencies and a second print mode that accommodates fast drying transparencies.

DETAILED DESCRIPTION

Figure 1:
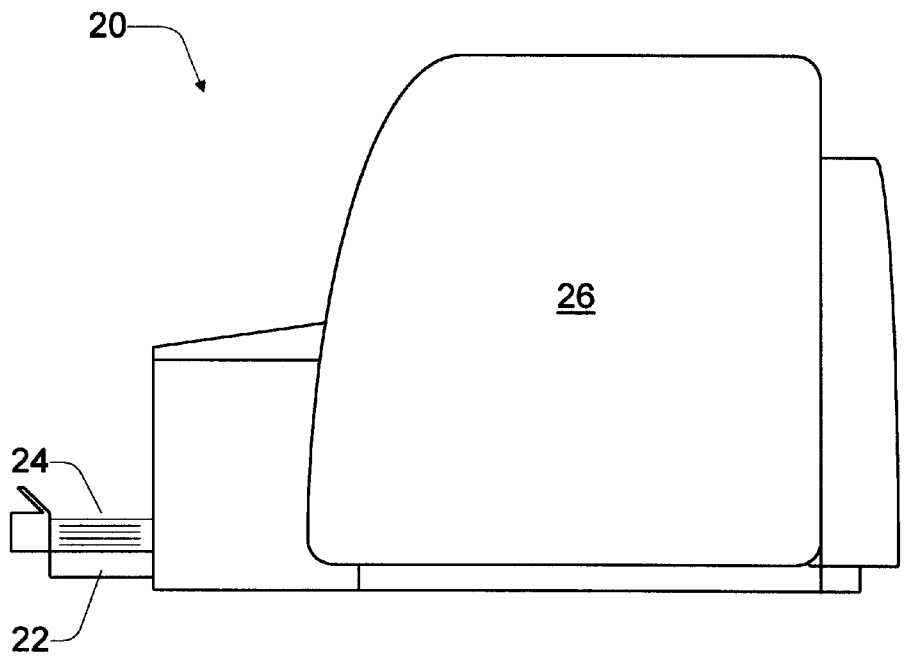
FIG. 1 is a diagrammatic illustration of an ink-jet printer, shown from a side view.

FIG. 1 shows a printer 20, embodied in the form of an inkjet printer. The printer 20 is representative of an inkjet printer series manufactured by Hewlett-Packard Company under the trademark "Deskjet". The inkjet printer 20 is capable of printing black-and-white and color. It is noted, however, that aspects of this invention may be implemented in other forms of printers including laser printers and thermal printers.

Printer 20 has a tray 22 to hold a stack of media 24. Typically, the media is plain paper, although other media types can be used. In particular, printer 20 is capable of printing on transparencies. The media 24 is taken from the tray 22, passed through a primary printing unit 26, which holds the printing mechanism, and returned to an output holder positioned above the tray 22.

Figure 2:
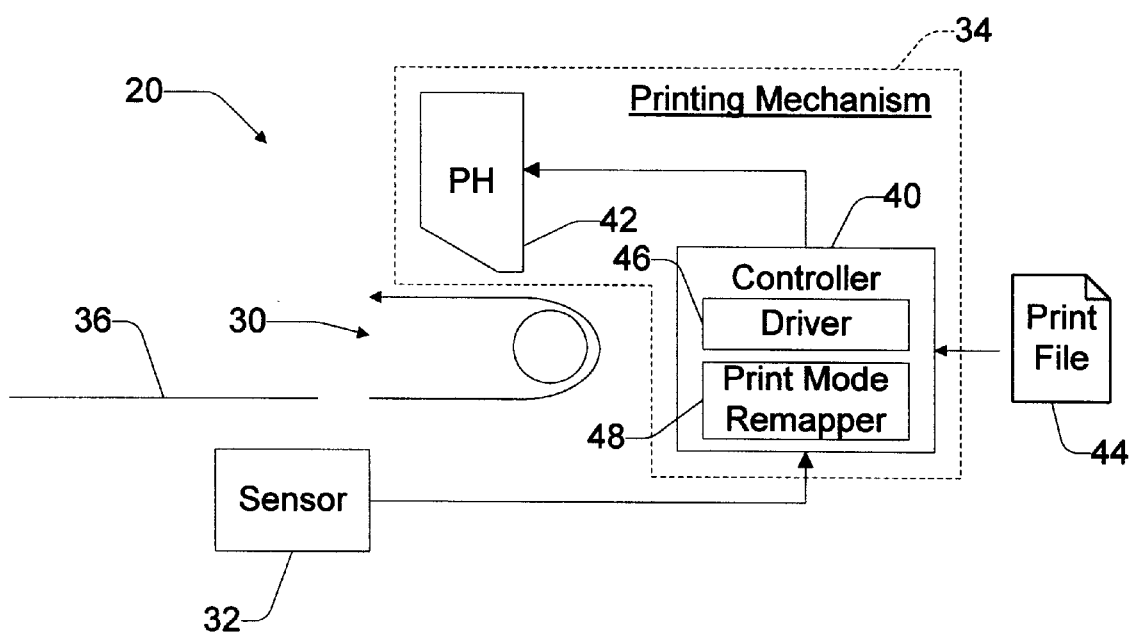
FIG. 2 is a diagrammatic illustration of functional components employed in the printer.

FIG. 2 shows the functional components of the printer 20. They include a media handler 30, a media sensor 32, and a printing mechanism 34. The media handler 30 consists of guides, rollers, motor, and other parts used to extract a single media sheet 36 from the tray, move it through the primary printing unit throat and through the printing mechanism, and deposit it to the output holder (as represented by the arrow). The media handler 30 is of conventional design, and will not be described in any further detail.

The media sensor 32 detects the type of media in the printer. The media sensor 32 is preferably positioned to detect the media type during the loading process as it is drawn from the tray 22 into the primary printing unit 26. In this exemplary implementation, the media sensor 32 is capable of detecting whether the media is a transparency or a piece of opaque plain paper. The media sensor 32 can also differentiate among various types of transparencies. In one implementation, the media sensor 32 distinguishes among one type of transparency with a paper strip and another type of transparency without a paper strip. The sensor can further determine how long the paper strip is, and this information can be used for selecting a more appropriate print mode option that may differ from a standard transparency print mode.

The media sensor 32 outputs different signals depending upon which media type is detected. The signal is passed to the printing mechanism 34. One preferred implementation of the media sensor 32 is to employ a through-beam optical interrupter sensor manufactured by Sharp Electronics.

The printing mechanism 34 has a controller 40 and at least one printhead 42. In non-color printers, a single printhead is used to print black-and-white. In some color printers, a single printhead prints both black-and-white and color, while in other color printers, two different printheads are used, one for black-and-white and second for color.

The controller 40 receives a print file 44 from a host computer (not shown). Based on the print file 44, the controller 40 commands the printhead 42 to print marks on the media 36 as the media moves through the printer. The controller 40 has a printhead driver 46 to control the physical printing functionality of the printhead 42. The driver 46 is operable in different print modes to produce different printing characteristics. Different print modes have different settings in terms of the quantity of ink deposited, print rate, color mixtures, order of printing colors and dots, and so forth.

The controller 40 also has a print mode remapper 48 that selects the appropriate print mode for the driver 46 depending upon the incoming file type and the type of media detected by the sensor 32. The remapper 48 selects a plain paper print mode when the media sensor 32 detects that the media is plain paper (or other opaque type) and the print file is for plain paper. The remapper 48 also selects a from one or more transparency print modes when the media sensor 32 detects that the media is transparent and the print mode is intended for a transparency.

The transparency print modes differ from the plain paper print mode in that they deposit a higher quantity of ink in comparison to the plain paper print mode. In addition, the transparency print mode may employ a slower print rate in comparison to the plain paper print mode. It is noted, however, that some transparent media may not require a slower print rate, as the transparency is specially designed for quick drying. For such transparent media, the transparency print mode may not require a slower print rate.

According to this implementation, the remapper 48 can select between two different transparent print modes depending upon which type of transparency is detected by the sensor 32. As an example, the two transparent print modes accommodate different types of transparencies, wherein one type is appropriate for a conventional, slow drying transparency and another type is appropriate for a fast drying transparency.

In addition to these print modes, the print mode remapper 48 remaps print modes in the event that the print file 44 is for one type of media but the media type detected by the sensor is for a different type of media. For example, if the print file 44 is intended for a transparent media but the media 36 is plain paper, the remapper 48 selects a transparent-to-paper print mode that remaps the printer settings appropriate for transparency to settings appropriate for paper. On the other hand, if the print file 44 is intended for plain paper but a transparency is in the tray, the remapper 48 selects the paper-to-transparent print mode that remaps paper settings to transparency settings.

The driver 46 and print mode remapper 48 can be implemented in software or firmware, which is loaded or embedded in a digital storage medium in the printer. Examples of possible digital storage media include ROM (read only memory), an EEPROM (electronically erasable, programmable read only memory), and a hard disk drive.

Figure 3:
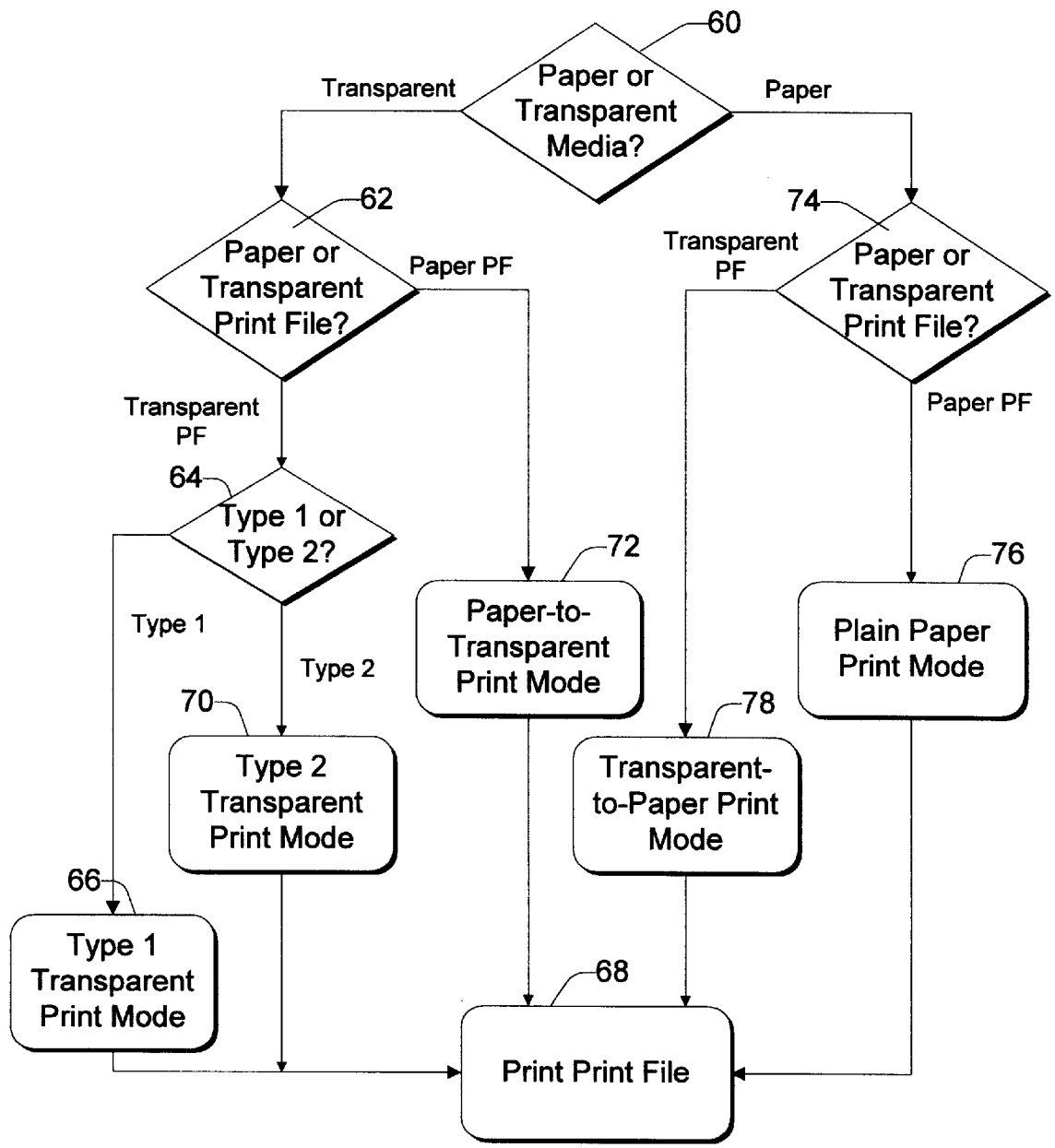
FIG. 3 is a flow diagram showing steps in a method implemented by the printer for remapping print modes to accommodate media type.

FIG. 3 shows instructions from an example program code that can be used to implement the print mode remapping functions. At step 60, the printer determines whether the media 36 is transparent or plain paper. If the media is transparent (i.e., the "transparent" branch from step 60), the printer next determines whether the print file 44 is intended for a transparency or plain paper (step 62). If the print file is for a transparency (i.e., the "transparent PF" branch from step 62), the printer next determines whether the transparency is a type 1 or type 2 (step 64).

As noted above, the media sensor 32 is capable of distinguishing among various types of transparencies. In the exemplary implementation, the media sensor 32 distinguishes between a transparency that has a paper strip of a first width along one edge (i.e., type 1) and a transparency that either has no paper strip or a paper strip of a second width along one edge (i.e., type 2). In other implementations, the sensor may distinguish among other types of transparencies as well.

If a type 1 transparency is detected (i.e., the "type 1" branch from step 64), the controller selects a type 1 transparent print mode (step 66) and prints the transparent print file 44 using the type 1 transparent print mode (step 68). On the other hand, if a type 2 transparency is detected (i.e., the "type 2" branch from step 64), the controller selects a type 2 transparent print mode (step 70) and prints the transparent print file 44 using the type 2 transparent print mode (step 68). As an example, the type 1 print mode differs from the type 2 print mode in terms of print rate, as the slower one of these print modes accommodates a conventional, slower drying transparency and the faster one of these print modes utilizes a faster print rate for a fast drying transparency.

With reference again to step 62, if the print file is for plain paper (i.e., the "paper PF" branch from step 62), the remapper 48 employs a paper-to-transparent print mode that remaps settings appropriate for plain paper to settings appropriate for a transparency (step 72). The printer then prints the paper print file 44 using the settings of this print mode (step 68).

If the media is determined to be paper (i.e., the "paper" branch from step 60), the printer determines whether the print file 44 is intended for a transparency or plain paper (step 74). If the print file is for plain paper (i.e., the "paper PF" branch from step 74), the printer selects the plain paper print mode (step 76) and prints the print file 44 using this print mode (step 68). Conversely, if the print file 44 is for a transparency (i.e., the "transparent PF" branch from step 74), the remapper 48 employs a transparent-to-paper print mode that remaps the transparent settings to paper settings (step 78). The printer then prints the print file 44 using the settings of this print mode (step 68).

As a result, the printer automatically selects the print mode to print a print file depending upon the media type and print file type that are detected. While the user can achieve more optimal results by expressly selecting a print mode, the printer can mitigate degradation to the image quality by automatically selecting an appropriate print mode in the event the user forgets to make an election.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

We claim:

1. A printer comprising:
    a media handler to convey media through the printer;
    a media sensor to detect a type of the media; and
    a printing mechanism configured to select (1) a paper print mode for printing a print file in an event that the media sensor detects that the media is paper and the print file is intended for paper, (2) a transparent print mode in an event that the media sensor detects that the media is transparent and the print file is intended for a transparency, (3) a paper-to-transparency print mode that remaps printer settings appropriate for paper to printer settings appropriate for transparencies if the print file is a paper print file and the media sensor detects that the media is transparent, and (4) a transparency-to-paper print mode that remaps printer settings appropriate for transparencies to printer settings appropriate for paper if the print file is a transparency print file and the media sensor detects that the media is not transparent.

2. A printer as recited in claim 1, wherein:

the media sensor is configured to distinguish among multiple types of transparencies;

the printing mechanism selects among multiple transparent print modes depending upon which type of transparent media the media sensor detects to print a print file intended for transparent media; and the printing mechanism prints at a slower rate during one type of transparency print mode in comparison to a second type of transparency print mode.

3. A method for printing a print file on a media, comprising the steps of:

automatically detecting a type of the media;

determining a type of the print file in accordance with the type of media for which the print file is intended; and selecting (1) a paper print mode to print the print file on the media in an event that the media is paper and the print file is intended for paper, (2) a transparent print mode in an event that the media is transparent and the print file is intended for a transparency, (3) a transparency-to-paper print mode that remaps printer settings appropriate for transparencies to printer settings appropriate for paper in an event that the media is not transparent but the print file is intended for a transparency and (4) a paper-to-transparency print mode that remaps printer settings appropriate for paper to printer settings appropriate for transparencies in an event that the media is transparent but the print file is intended for paper.

4. A method as recited in claim 3, further comprising the following steps:

distinguishing among multiple types of transparent media;

selecting among multiple transparent print modes depending upon the type of transparent media and in the event that the print file is intended for transparent media; and printing the print file at a slower print rate during one of the multiple transparent print modes in comparison to another one of the multiple transparent print modes.

5. In a printer capable of detecting whether the media is transparent or paper, a program code embodied in a digital storage medium comprising:

a code segment to instruct the printer to print a print file using a paper print mode in an event that the media is paper and the print file is intended for paper;

a code segment to instruct the printer to print a print file using a transparent print mode in an event that the media is transparent and the print file is intended for a transparency;

a code segment to instruct the printer to print a print file using a transparency-to-paper print mode that remaps printer settings appropriate for transparencies to printer settings appropriate for paper in an event that the media is not transparent but the print file is intended for a transparency; and a code segment to instruct the printer to print a print file using a paper-to-transparency print mode that remaps printer settings appropriate for paper to printer settings appropriate for transparencies in an event that the media is transparent but the print file is intended for paper.

6. A program code as recited in claim 5, further comprising a code segment to instruct the printer to print the print file using one of multiple transparency print modes depending upon a type of transparent media that is detected and a code segment to instruct the printer to print the print file at a slower print rate during one of the multiple transparent print modes in comparison to another one of the multiple transparent print modes.

* * * * *